Patented Apr. 8, 1941

2,237,460

UNITED STATES PATENT OFFICE 2,237,460

POLYMERIZATION OF OLEFINS

Ralph B. Thompson, Chicago, Ill., assignor to Universal Oil Products Company, Chicago, Ill., a corporation of Delaware No Drawing. Application May 6, 1940,
Serial No. 333,595

15 Claims. (Cl. 196—10)

This invention relates to the use of catalytic materials in polymerizing olefins, and particularly normally gaseous olefins, to produce normally liquid hydrocarbons boiling within the approximate range of gasoline, although the process may be applied also in other types of polymerizing reactions.

In a more specific sense the invention is concerned with the use as catalyst of a particular type of normally solid material which has specific properties both in regard to its activity in accelerating and directing hydrocarbon polymerizing reactions, in its stability in service, and in its relatively low corrosive properties when employed in ordinary commercial apparatus comprising principally various types of steel.

The type of catalyst hereinafter indicated is especially adapted to promote the controlled polymerization of normally gaseous olefins such as those present in the by-product gases from oil-cracking operations to produce additional yields of high antiknock blending fluids, and therefore the catalyst and process will be described in connection with this particular type of reaction.

In one specific embodiment the present invention comprises a process for converting normally gaseous olefins into normally liquid hydrocarbons of gasoline boiling range which comprises subjecting said normally gaseous olefins under polymerizing conditions of temperature and pressure to contact with a solid heteropolyacid prepared from sulfuric acid and chromic sulfate.

Olefinic hydrocarbons with which the present invention is concerned occur along with paraffinic or saturated hydrocarbons in commercial hydrocarbon mixtures such as those encountered in the cracking of petroleum, in gas-making processes, and as by-products in various chemical industries. Suitable olefins may be obtained also by catalytic dehydrogenation or pyrolysis of the corresponding paraffin hydrocarbons. In general, olefins are more active chemically than other classes of hydrocarbons. Even when under mild catalytic influence they exhibit this reactivity in their pronounced tendency to polymerize and form substances of higher molecular weight.

The process of this invention provides for utilizing more effectively the olefinic constituents of commercial hydrocarbon mixtures, particularly propene and butenes occurring in the gases derived from oil-cracking processes to produce valuable derivatives therefrom and it may be applied also to individual olefins produced by special chemical methods or by fractionation of mixtures.

The present process is particularly directed to the production of dimers, trimers, and mixed polymers from propenes and butenes, particularly such polymers as boil at temperatures within the approximate range of commercial motor fuel such as, for example, from approximately 100 to 400° F. It has been found that the dimers, some of the trimers, and mixed polymers of propene, the butenes and pentenes boil within this range; and, furthermore, that these compounds have unusually high antiknock values. Polymers of higher molecular weights than dimers and trimers of the heavier monoolefins indicated are generally of too high boiling point to be used in commercial gasolines. Of the lower boiling and normally gaseous olefins, ethylene is the most resistant to polymerization in the presence of catalysts of the present character, but in the presence of its higher homologs it is possible that certain amounts of mixed polymers are formed.

Chromic sulfate pentadecahydrate and sulfuric acid form solid complex heteropolyacids of the general formula $Cr_2(SO_4)_3 \cdot xH_2SO_4 \cdot yH_2O$ in which $x$ may vary from 1 to 10 or possibly even more than 10, and $y$ may vary from 0 upward. These materials, which may be readily prepared, vary from dark green to gray in color and possess considerable mechanical strength even at elevated temperatures as high as 450° F.

Granular materials of the present types and composites of these materials with substantially inert carriers are characterized by their ability to catalyze the polymerization of olefins to produce relatively low boiling normally liquid polymers rather than heavy tars or pitches and by their relatively long life. In contrast to this, it is notable that when employing sulfuric acid as a polymerizing agent, caution is necessary to prevent occurrence of undesirable side reactions such as ester formation and that when employing metal halides such as aluminum chloride or zinc chloride, the tendency toward the formation of heavy polymers is so pronounced that it is not possible to produce more than minor amounts of desirable low boiling polymers without the concurrent production of relatively large quantities of heavy hydrocarbonaceous materials.

Furthermore, granular catalysts of the present preferred character, in the substantial absence of moisture, have relatively low corrosive action to steel equipment and possess sufficient structural strength that they may be used as reactor filling material during relatively long periods of service without undue disintegration and powdering.

Because of the possibility of varying the proportions of sulfuric acid and chromic sulfate which go to form such heteropolyacids, alternative catalysts exist, each of which has its own particular catalyzing and polymerizing character which may not be equivalent with these properties of composites of different composition.

The particles of the above described catalytic material are generally placed in vertical cylindrical reactors or treating towers and the olefin or olefin-containing gas mixture is passed downwardly therethrough at a temperature in the approximate range of 50–400° F. and under a pressure of the approximate order of 100–2000 pounds per square inch when dealing with such hydrocarbon mixtures as a fraction of 3 and 4 carbon atom hydrocarbons obtained incidental to cracking, generally containing approximately 10–30% of the so-called higher olefins comprising essentially propene, isobutene, and normal butenes. When operating upon a typical butane-butene fraction, heteropolyacids of the types which may be prepared from sulfuric acid and chromic sulfate are effective under conditions favoring the utilization of both isobutene and normal butenes which involves mixed polymerization, although substantial polymerization of isobutene may be effected under less severe conditions. Isobutene polymers, as well as mixed polymers formed from gases containing isobutene and normal butene or propene, or from gases containing isobutene, normal butene, and propene, may be hydrogenated to form substantially paraffinic products of high octane number.

The following examples of methods of preparing heteropolyacids from sulfuric acid and chromic sulfate and of several results obtained in their use, are characteristic, but these data are introduced with no intention of thereby limiting the broad scope of the invention. The method of preparing a chromisulfuric acid, hereinafter described, will serve to illustrate that followed in producing similar heteropolyacids within the composition range of chromimonosulfuric acid, $Cr_2(SO_4)_3 \cdot 1H_2SO_4$, to chromidecasulfuric acid, $Cr_2(SO_4)_3 \cdot 10H_2SO_4$.

EXAMPLE I 100 parts by weight of chromic sulfate pentadecahydrate, $Cr_2(SO_4)_3 \cdot 15H_2O$, was dissolved in 100 parts by weight of water and thereto was added 44.3 parts by weight of sulfuric acid of 100% concentration. The resulting mixture was evaporated on a steam bath to a thick sirup which was dried in an oven at 280° F. for 12–25 hours after which the material was sufficiently dry that it could be broken into pieces to facilitate more complete drying to constant weight. The resulting material was broken and screened to give particles of 6–10 mesh particle size. These particles could be dissolved slowly in water to form green solutions which gave no precipitate with barium chloride solution.

The 6–10 mesh granular material, after further drying in a stream of air at 450° F. during 10 hours, was used as a filler in a steel tube through which was passed a mixture of isobutane and isobutene containing a small amount of propane. A run, in which a mixture of 4 parts by weight of propane, 25 parts by weight of isobutene, and 156 parts by weight of isobutane was passed at 85° F. under a pressure of 500 pounds per square inch through a steel tube containing 60 parts by weight of the above described 6–10 mesh material, yielded 21 parts by weight of polymers consisting approximately of 10% by volume of di-isobutene and 90% of tri-isobutene.

EXAMPLE II

The catalyst used in Example I, hereinafter referred to as I, and another prepared similarly but with a higher proportion of sulfuric acid, and indicated below as II, were analyzed. The results of these analyses expressed as chromium sesquioxide and sulfur were as follows:

| Catalyst | Percent $Cr_2O_3$ | Percent sulfur |
|---|---|---|
| I | 26.2 | 24.6 |
| II | 21.1 | 24.3 |

On the basis of these analyses, the catalysts appeared to be mixtures of various chromipolysulfuric acids. A calculation of empirical formulas gave the following:

I  $2Cr_2(SO_4)_3 \cdot 3H_2SO_4 \cdot 5H_2O$
II  $2Cr_2(SO_4)_3 \cdot 5H_2SO_4 \cdot 9H_2O$ Several runs on the polymerization of isobutene from the isobutene-isobutane mixture used in Example I in the presence of the two catalysts hereinabove set forth gave the results shown in Table I.

TABLE I

*Polymerization of isobutene in the presence of chromi-sulfuric acid catalysts*

| Run number | 1 | 2 | 3 | 4 |
|---|---|---|---|---|
| Catalyst | I | I | II | II |
| Temperature, °F | 200 | 200 | 90 | 200 |
| Pressure, #/in.² | 200 | 1000 | 500 | 500 |
| Charge, vol/hr. per vol. of catalyst | 1.0 | 1.0 | 1.0 | 1.0 |
| Composition, parts by weight: | | | | |
| Propane | 4 | 9 | 5 | 7 |
| Isobutene | 22 | 52 | 27 | 39 |
| Isobutane | 141 | 331 | 171 | 248 |
| Polymer product, parts by weight | 19 | 33 | 23 | 22 |
| Yield, percent by weight of isobutene charged | 85 | 64 | 86 | 56 |
| Distillation of polymer: | | | | |
| Initial boiling point, °F | 106 | 36 | 37 | 100 |
| 10% | 146 | 123 | 161 | 103 |
| 20% | 173 | 130 | 177 | 108 |
| 30% | 179 | 140 | 182 | 123 |
| 40% | 180 | 163 | 185 | 144 |
| 50% | 180 | 175 | 187 | 176 |
| 60% | 181 | 178 | 189 | 180 |
| 70% | 185 | 179 | 197 | 181 |
| 80% | 194 | 180 |  | 183 |
| 90% |  | 183 |  |  |
| End boiling point | 194 | 192 | 200 | 187 |
| Volume percent over | 83 | 95 | 74 | 89 |
| Residue | 17 | 5 | 26 | 11 |

The character of the present invention and its practical value are evident from the preceding specification and the numerical data introduced in its support, although neither section is intended to be unduly limiting.

I claim as my invention:

1. A process for converting normally gaseous olefins into normally liquid hydrocarbons of gasoline boiling range which comprises subjecting said normally gaseous olefins under polymerizing conditions of temperature and pressure to contact with a solid heteropolyacid prepared from sulfuric acid and chromic sulfate.

2. A process for converting normally gaseous olefins into normally liquid hydrocarbons of gasoline boiling range which comprises subjecting said normally gaseous olefins at a temperature in the approximate range of 50-400° F. under a pressure within the approximate range of 100-2000 pounds per square inch to contact with a solid heteropolyacid prepared from sulfuric acid and chromic sulfate.

3. A process for producing high quality gasoline from a normally gaseous olefin-containing hydrocarbon fraction which comprises subjecting said fraction under polymerizing conditions of temperature and pressure to contact with a solid heteropolyacid prepared from sulfuric acid and chromic sulfate.

4. A process for producing high quality gasoline from a normally gaseous olefin-containing hydrocarbon fraction which comprises subjecting said fraction at a temperature in the approximate range of 50-400° F., under a pressure within the approximate range of 100-2000 pounds per square inch to contact with a solid heteropolyacid prepared from sulfuric acid and chromic sulfate.

5. A process for converting normally gaseous olefins into normally liquid hydrocarbons of gasoline boiling range which comprises subjecting said normally gaseous olefins under polymerizing conditions of temperature and pressure to contact with a solid heteropolyacid of the general formula $Cr_2(SO_4)_3 \cdot xH_2SO_4 \cdot yH_2O$ in which $x$ may vary from 1 to approximately 10 and $y$ may vary from 0 upward.

6. A process for converting normally gaseous olefins into normally liquid hydrocarbons of gasoline boiling range which comprises subjecting said normally gaseous olefins at a temperature in the approximate range of 50-400° F. under a pressure within the approximate range of 100-2000 pounds per square inch to contact with a solid heteropolyacid of the general formula

$$Cr_2(SO_4)_3 \cdot xH_2SO_4 \cdot yH_2O$$

in which $x$ may vary from 1 to approximately 10 and $y$ may vary from 0 upward.

7. A process for converting propene into normally liquid hydrocarbons of gasoline boiling range which comprises subjecting said propene at a temperature in the approximate range of 50-400° F. under a pressure within the approximate range of 100-2000 pounds per square inch to contact with a solid heteropolyacid of the general formula $Cr_2(SO_4)_3 \cdot xH_2SO_4 \cdot yH_2O$ in which $x$ may vary from 1 to approximately 10 and $y$ may vary from 0 upward.

8. A process for converting isobutene into normally liquid hydrocarbons of gasoline boiling range which comprises subjecting said isobutene at a temperature in the approximate range of 50-400° F. under a pressure within the approximate range of 100-2000 pounds per square inch to contact with a solid heteropolyacid of the general formula $Cr_2(SO_4)_3 \cdot xH_2SO_4 \cdot yH_2O$ in which $x$ may vary from 1 to approximately 10 and $y$ may vary from 0 upward.

9. A process for converting normal butene into normally liquid hydrocarbons of gasoline boiling range which comprises subjecting said normal butene at a temperature in the approximate range of 50-400° F. under a pressure within the approximate range of 100-2000 pounds per square inch to contact with a solid heteropolyacid of the general formula $Cr_2(SO_4)_3 \cdot xH_2SO_4 \cdot yH_2O$ in which $x$ may vary from 1 to approximately 10 and $y$ may vary from 0 upward.

10. A process for effecting mixed polymerization of isobutene and normal butene which comprises subjecting a 4-carbon atom hydrocarbon fraction containing both isobutene and normal butene at a temperature in the aproximate range of 50-400° F. under a pressure of from approximately 100 to 2000 pounds per square inch to contact with a solid heteropolyacid of this general formula

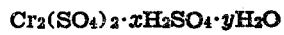

$$Cr_2(SO_4)_2 \cdot xH_2SO_4 \cdot yH_2O$$

in which $x$ may vary from 1 to approximately 10, and $y$ may vary from 0 upward.

11. A process for effecting mixed polymerization of isobutene and propene which comprises subjecting a normally gaseous hydrocarbon fraction containing both isobutene and propene at a temperature in the approximate range of 50-400° F. under a pressure of from approximately 100 to 2000 pounds per square inch to contact with a solid heteropolyacid of this general formula, $Cr_2(SO_4)_3 \cdot xH_2SO_4 \cdot yH_2O$ in which $x$ may vary from 1 to approximately 10 and $y$ may vary from 0 upward.

12. A process for converting isobutene into substantial yields of di-isobutene and tri-isobutene which comprises subjecting said isobutene at a temperature in the approximate range of 50-400° F. under a pressure in the approximate range of 100-2000 pounds per square inch to contact with formed particles of a solid heteropolyacid prepared from sulfuric acid and chromic sulfate.

13. A process for converting isobutene into substantial yields of di-isobutene and tri-isobutene which comprises subjecting said isobutene at a temperature in the approximate range of 50-400° F. under a pressure in the approximate range of 100-2000 pounds per square inch to contact with formed particles of a solid heteropolyacid of the general formula $Cr_2(SO_4)_3 \cdot xH_2SO_4 \cdot yH_2O$ in which $x$ may vary from 1 to approximately 10 and $y$ may vary from 0 upward.

14. A process for producing high quality gasoline from a normally gaseous olefin-containing hydrocarbon fraction which comprises subjecting said fraction at a temperature in the approximate range of 50-400° F. under a pressure within the approximate range of 100-2000 pounds per square inch to contact with a solid heteropolyacid prepared from sulfuric acid and chromic sulfate composited with a substantially inert carrier.

15. A process for converting normally gaseous olefins into normally liquid hydrocarbons of gasoline boiling range which comprises subjecting said normally gaseous olefins at a temperature in the approximate range of 50-400° F. under a pressure within the approximate range of 100-2000 pounds per square inch to contact with a solid heteropolyacid of the general formula

$$Cr_2(SO_4)_3 \cdot xH_2SO_4 \cdot yH_2O$$

in which $x$ may vary froom 1 to approximately 10 and $y$ may vary from 0 upward, composited with a substantially inert carrier.

RALPH B. THOMPSON.